United States Patent

Bologna

[11] Patent Number: 5,097,619
[45] Date of Patent: Mar. 24, 1992

[54] SNAGLESS FISHING LURE
[75] Inventor: Frank Bologna, Warren, Mich.
[73] Assignee: Fish Stories Unlimited, Inc., Dearborn Heights, Mich.
[21] Appl. No.: 485,975
[22] Filed: Feb. 27, 1990
[51] Int. Cl.5 .............................................. A01K 83/00
[52] U.S. Cl. ........................................................ 43/35
[58] Field of Search ............................ 43/34, 35, 36, 37

[56] References Cited
U.S. PATENT DOCUMENTS

| | | | |
|---|---|---|---|
| 1,633,419 | 6/1927 | Reed | 43/35 |
| 1,994,168 | 10/1934 | Boyko | 43/35 |
| 2,517,458 | 8/1950 | Amspaugh | 43/36 |

Primary Examiner—Kurt Rowan
Assistant Examiner—James Miner
Attorney, Agent, or Firm—Basile and Hanlon

[57] ABSTRACT

A snagless fishing lure for attachment to a fishing line. The fishing lure includes a decoy body with an attached base. A fish hook having first and second hook members and means for urging the hook members away from one another is attached to the base. A depressible trip lever is also pivotally attached to the base. The trip lever has an elongated lever arm with a first end movable relative to the base member and a second end opposed to the first end. A hook contacting member is contiguously attached to the second end of the elongated lever arm. The hook contacting member has a central longitudinal junction and a pair of flanges depending therefrom. When the fishing lure is cocked for operation, the first and second hook members are retained behind hook retaining flanges perpendicular to the base. The hook contacting member is interposed between the base and the retained hooks. Depression of the elongated lever arm forces the hook contacting member away from the base, freeing the hook members from their retracted position.

8 Claims, 1 Drawing Sheet

SNAGLESS FISHING LURE

BACKGROUND OF THE INVENTION

1. Field of the Invention

This invention relates to fishing lures and trolling hooks particularly those useful in waters containing weeds and other debris.

2. Discussion of the Relevant Art

In sport fishing, many fisherman prefer to fish in and among various vegetation and other debris, as it is generally recognized that many species of fish prefer such habitats. In general a lure attached to fishing line is cast into the water to attract the desired fish. The lure generally includes a body which the fish will consider food and at least one hook configured to snag itself on the inside of the fish's mouth. The fisherman may move or jiggle the fishing pole to which the fishing line is attached to animate the lure. Alternately, the fisherman may troll a given area of water to seek fish.

Most fishing lures previously available have at least one hook which is permanently exposed. This hook embeds or sets in the throat or mouth of the fish when hit upon. Such lures are not completely satisfactory in all situations. These lures lack any positive action to ensure that the hook is anchored firmly in the fish's flesh. Furthermore, such lures become tangled in weedy or debris-laden waters where fish frequent. This can lead to loss of lures and other valuable fishing equipment.

Boyko U.S. Pat. No. 1,994,168, proposes an automatic trolling hook which releases a pair of hooks when seized upon a fish. The hooks will engage the flesh in the throat or mouth walls upon their release. While trolling, the hooks remain in the retracted position thereby permitting snagless passage through the water and weed beds.

The Boyko device includes a body member having a metal plate with a pair of outwardly expanding hook members attached thereto. The hook members are capable of being closed together beneath the body member and held in place by a short hook flange formed in the metal plate. The Boyko device also includes a trip level mounted on the flat metal plate to disengage the hook members from behind the short hook flange.

The Boyko device has several drawbacks. The position of the hooks when retracted does not prevent all snags from occurring because some protrusion of the hooks can and does occur. Furthermore, the trigger mechanism as designed was prone to breakage and misfire. The trigger throughbore was composed of two eyelets bent from the flat metal plate. It has been found that a great number of trigger failures are due to this design configuration. The trigger itself was constructed as a flat slender arm having two outward extensions on the end opposed to the pivotal attachment hook to slide underneath the trigger mechanism resulting in a misfire. Finally, the Boyko reference employs a spring hook which, with repeated use, is prone to increased breakage at or near the spring coil.

SUMMARY OF THE INVENTION

The present invention is an improved snagless fishing lure suitable for attachment to a fishing lure which includes a base member; a fish hook attached to the base member, the fish hook having a first hook member, a second hook member and means for urging the hook members away from one another; a depressible trip lever pivotally attached to the base member; and means for pivotally connecting the depressible trip lever to said base member. The depressible trip lever includes an elongated lever arm having a first end movable relative to the base member, a second end opposed to the first end, pivotal attachment means located between the first end and the second end, and a hook contacting member contiguously attached to the second end of the lever arm. The hook contacting member has a central junction and a pair of flanges depending therefrom.

BRIEF DESCRIPTION OF THE DRAWINGS

To further illustrate the present invention, the following drawing is provided in which like reference numerals are employed for the various elements throughout the several figures and in which.

DESCRIPTION OF THE PREFERRED EMBODIMENTS

Figure 1:
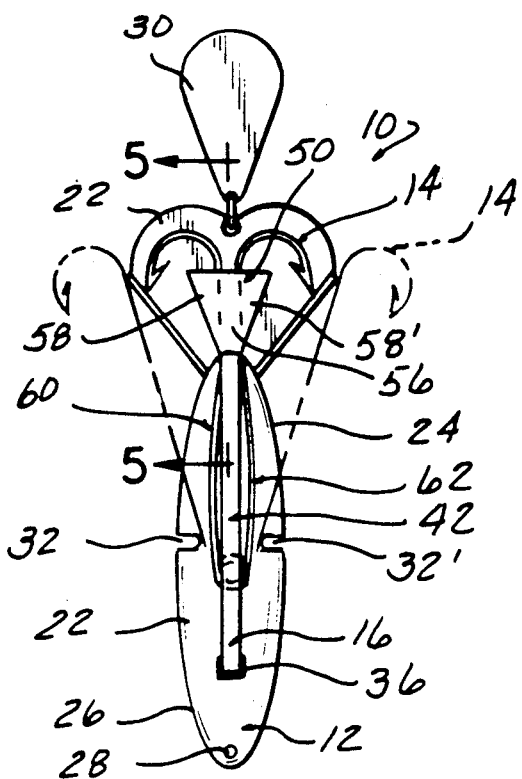
FIG. 1 is a bottom view of the snagless fishing lure of the present invention.
Figure 2:
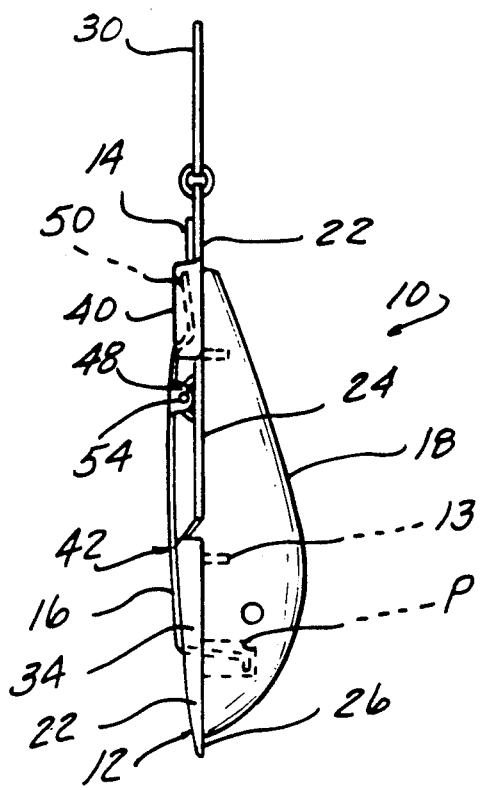
FIG. 2 is a side view of the snagless lure of the present invention.
Figure 3:
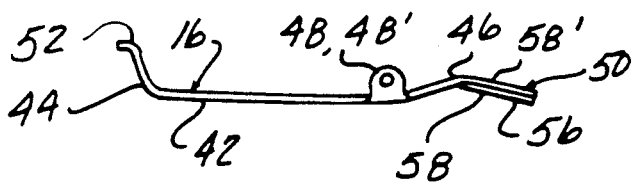
FIG. 3 is a side perspective view of the depressible trip lever of the present invention.
Figure 4:
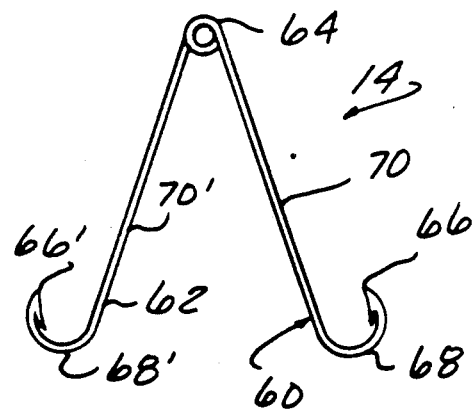
FIG. 4 is a top plan view of the compressible fish hook of the present invention.

The device of the present invention is a snagless fishing lure 10 which includes a base 12, a compressible fish hook 14 and a depressible trip lever 16. The base 12 is attached to a body 18 by any suitable securing means such as screw 13 (shown in phantom in FIG. 2) or the like. The body 18 may have any desired configuration such as that a fish as is shown in FIG. 2. Similarly the body may be made of a suitable light weight material such as plastic or the like in any desired color or colors. The bottom of body 18 is essentially flat to permit ready attachment of the base 12. A recess R (shown in phantom in FIG. 2) may be formed in the forward portion of body 18 to accommodate the inward travel of depressible trip lever 16.

The base 12 is, preferably a contoured metal plate having an approximately flat tail section 20, a contoured outwardly projecting bulbous head section 22, and an essentially flat midsection 24. The head section 22 and midsection 24 essentially correspond to the overlying body 18 and, together, are essentially elliptical when viewed from the bottom. The tail section 20 is contiguously attached to the midsection 24 and extends outward beyond the attached body 18 of the lure 10. Generally, the outer lines of the tail section 22 correspond to the stylized lines of a fish tail.

Forward of the head section 22, there is located an optional projection 26 with an aperture 28 located therein. The aperture 28 permits attachment of a suitable fishing or trolling line (not shown). At the central rearward end of the tail section 20, a suitable spinner 30 or other optional lure-stabilizing, or fish-attracting device may be attached.

A pair of opposed inlets 32, 32' extend laterally inward on base 12 at the junction between head section 22 and midsection 24. These inlets 32, 32' provide an attachment and direction means for fish hook 14 which will be described in greater detail subsequently. The bulbous head section 22 of the base 12 defines a thin chamber 34 and is provided with aperture 36 centrally located therein. The aperture 36 is opposed to the recess R located in the body 18.

Means for pivotally attaching the depressible trip lever 16 to the base 12 are located centrally in the midsection 24. The pivotal attachment means 38 is, preferably, an outwardly extending curved arcuate member integrally formed in the base 12 and defining a lateral through-slot. The slot may have sufficient width to permit a small amount of rearward-to-forward movement of the attached depressible trip lever 16.

The tail section 20 is provided with exterior flange 40, 40' located on its two angularly opposed outer edges to retain the fish hook 14 in its retracted position in a manner which will be described in greater detail subsequently. The exterior flanges 40, 40' are, preferably straight members which extend outward from a narrow neck portion to an open end point. The tail section 20 also includes an outwardly projecting flat fin potion which extends beyond the outermost edge of the flange members 40, 40'. The exterior flanges 40, 40' have relative dimensions which will be discussed in detail subsequently. These flanges 40, 40' retain the hook 14 in a retracted position.

The depressible trip lever 16 includes an elongated lever arm 42 having a first end 44 movable relative to the base 12, a second end 46 opposed to the first end 44, pivotal attachment means 48 located between the first end 44 and the second end 46, and a hook contacting member 50 contiguously connected to the second end 46. The first end 44 of the elongated lever arm 42 is oriented essentially perpendicularly to the main portion of the elongated lever arm 42 and has an outwardly curved tab 52 located on its terminal end. The curved tab 52 of first end 42 extends through the aperture 36 into the thin chamber 34 defined by the bulbous head section 22 of the base 12. The outwardly curved tab 52 engages the forward edge of aperture 36 to help maintain the depressible trip lever 16 in position relative to the base 12. The aperture 16 is of sufficient size to permit free movement of the first end 42 of the trip lever 16 into and back out of the inner chamber 34 and associated recess R with outward movement being limited, in part, by the engagement of tab 52 with the edge of aperture 36.

The pivotal attachment means 48 of depressible trip lever 16 is preferably a pair of perpendicularly projecting members disposed parallel to one another on either side of the elongated lever arm 42. The projecting members each have a centrally disposed aperture adapted to receive the through bolt 54 which also extends through the curved arcuate member 38 of the base 12 to maintain the depressible trip lever in pivotally attached relationship relative to the base 12.

The hook engaging portion 50 of the depressible trip lever 16 extends outward and downward relative to the base 12 when the trip lever is in position thereon. The hook engaging portion 50 has a longitudinally extending central junction area 56 and a pair of flared flanges 58, 58' extending therefrom.

Figure 5:
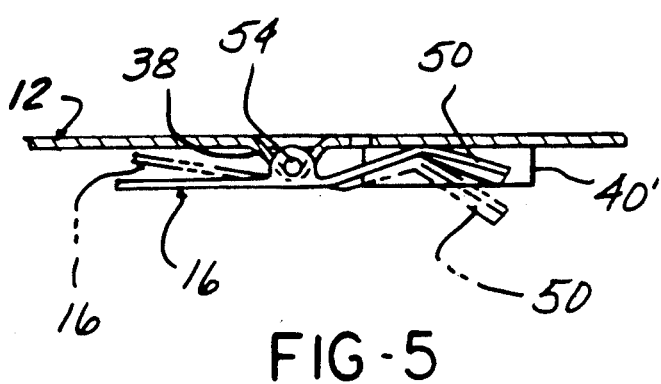
FIG. 5 is a cross-sectional view of the rear portion of the base and depressible trip lever of the present invention with the depressed position in which the hook engaging portion is spaced away from the base shown in the phantom.

Depression of the elongated lever arm 42 near the first end 44 causes the curved end 52 to progress into the inner chamber 34 and on into recess R. The second end 46 of lever arm 42 pivots away from its first position in contact with base 12 to its second upper position (not shown in phantom in FIG. 5). Flanges 40, 40' extend perpendicularly from the edges of tail section 20 to a point equal to the point of highest travel of the flanges 58, 58' of the hook engaging portion 50.

The fish hook 14 of the present invention is composed of a fish hook member 60, a second hook member 62 and means 64 for biasingly urging the first hook member 60 and the second hook member 62 away from one another. The fish hook 14 is, preferably, made of a strong metal wire with the first hook member 60, the second hook member 62 and the urging means 62 being in the same plane relative to one another.

The first and second hook members 60, 62 each include a point 66, 66', a bend 68, 68' contiguous with the respective point 66, 66' and a generally straight shank 70, 70' contiguous with the respective bend 68, 68'. Each shank 70, 70' has a second end opposed to the respective bend 68, 68'. The urging means 64 is, preferably, a compressible partially circular member having two spaced apart ends to which the second ends of a respective shank 70, 70' are contiguously joined to provide a "key hole" configuration. Compression of the first and second hook members 60, 62 toward one another, in turn, results in a narrowed gap between the two ends of the compressible member with the compressive force being transferred uniformly therethrough.

The urging means 64 of fish hook 14 is, preferably positioned within the inner chamber 34 with the shanks 70, 70' extending outward through inlets 32, 32' respectively. Side-to-side movements of the fish hook 14 is restrained by insertion of the fastening screw (S) through the interior of the semi-circular member.

In the cocked or operative position, the hook members 60, 62 of fish hook 14 are manually compressed against the expansion force exerted by the urging means 64. The compression forces are transferred throughout the entire fish hook 14 and evenly distributed therethrough. The hook members 60, 62 are maintained in their compressed position by engagement with hook-retaining flanges 40, 40'. The hook engaging portion 50 of the depressible trip lever 16 is interposed between the base 12 and the outer portion of the shanks 70, 70' of hook members 60, 62 when the hook members 60, 62 are in the retracted position. The sloping orientation of flanges 58,58' relative to the central ridge 56 helps ensure that the hook engaging portion is maintained between the hook members 60, 62 and the base 12 and that one or both hook members 60, 62 do not slip below the hook engaging portion 50 during cocking to cause a misfire.

When the lure 10 is hit on by a fish, the biting action of the fish urges the elongated lever arm 42 toward the base 12 while pivoting the hook engaging portion 50 away from contact with the base 12. The hook engaging portion 50 contacts the hook members 60, 62 urging them from behind hook-retaining flanges 40, 40'. Once released from the hook-retaining flanges 40, 40', the hook members 60, 62 naturally expand contract the fleshy portion of the mouth or throat of the fish instantly piercing the same and preventing any escape of the fish once seized. The hook may be easily released from the caught fish by again depressing the hook arms together.

In the present invention, the height of the hook retaining flanges 40, 40', angle and degree of travel of the hook engaging member 50 and the slope of the flanges 58, 58' are carefully calibrated to ensure that the distal edge of flanges 58, 58' extends to a position essentially equal to the outer edge of the flanges 40, 40' with the central ridge extending to a position higher than the outer edge of flanges 40, 40. This configuration permits the smooth disengagement of the hook members 60, 62 from behind flanges 40, 40'.

The elevated flanges 40, 40' are perpendicular to the base 12 and extend outward form one another relative to the midsection 24 of the base 12 forming a neck opening at that location. The size of the neck opening is approximately equal to two times the width of the elongated lever arm 42. This relationship permits the side-by-side orientation of fish hook members 60, 62 when in the retracted or operative position. This also insures that the hook members 60, 62 are fully contained behind the flanges 40, 40' until seized upon by a fish.

Having thus disclosed the present invention, what is claimed is:

1. A base member having a flat midsection and a contoured head section contiguous thereto, wherein said flat midsection and said contoured head section define an essentially elliptical periphery which has two opposed inlets located at the juncture of said head section and said midsection said opposed inlets extending inwardly from said outer periphery defining a localized throat region thereby, said base member further having a flat tail section contiguously attached to said midsection at a location opposed to said head section, said flat tail section having outwardly flared hook retaining flanges angularly opposed to one another to define a narrow channel contiguous to said midsection, said narrow channel having a width essentially equal to said throat region contiguous to said midsection and a broadened end opening opposed to said narrow channel, said flanges having a height at least as great as said contoured head section;
   - a fish hook movably attached to said base member, said fish hook having a first hook member having a first point, bend and shank, a second hook member having a second point, bend, and shank and an overlying biasing coil attached to said first and second shanks capable of biasingly extending said first and second hook members away from one another said overlying biasing coil located below said contoured head section and said first and second shanks extending outwardly through said inlets, said first and second hook members compressibly movable between a first extended position and a second retracted position wherein said hooks are retained by said hook retaining flanges;
   - a depressible trip lever pivotally connected to said base member and positioned to contact said first and second hook members disengaging said hook members from retention behind said hook retaining flanges, said trip lever comprising an elongated lever arm having a first end extending into an associated aperture located in said contoured head region and inwardly and outwardly movable relative thereto, a second end opposed to said first end, a flat elongated region having an essentially uniform width extending from said first end to said second end, said first end of said lever arm having a projection extending upwardly into said associated aperture oriented essentially perpendicularly to said flat elongated region and means for retaining said first end in said aperture, pivotal attachment means located on said flat elongated region between said first end and said second end, said second end having a region extending inward from said pivotal attachment means towards said flat tail section of said base at an oblique angle defined by an interior surface of said elongated lever arm and an interior surface of said inwardly extending region, said second end terminating in a base-contacting surface adapted to releasably contact said base at a point located in said flat tail section, and a hook contacting member contiguously connected to said base-contacting surface of said second end of said lever arm, said hook contacting member extending angularly outward from therefrom and having a central longitudinal junction and a pair of flanges depending from said junction, said longitudinal flanges disposed between said hook and said base when said hook members are in said retracted position; and
   - means for pivotally connecting said depressible trip lever to said base member.

2. The fishing lure of claim 1 wherein said biasing means of said fish hook comprises a compressible semicircular central planar member having two spaced-apart ends, and said first and second hook members each comprising a point, a bend contiguous to said point, a shank contiguous with said bend having a second end opposed to said bend, said second ends attached respectively to said spaced apart ends of said compressible semi-circular central planar member.

3. The fishing lure of claim 1 wherein said pivotal connecting means comprises;
   - a curved tabular member having first and second ends integrally attached to said base member and a central portion extending outwardly therefrom, said central portion defining a throughbore;
   - a pair of parallel tabs extending perpendicularly outward from said elongated lever arm of said depressible trip lever, said tabs each having a central aperture defined therein; and
   - a rod member extending through said apertures and said curved tabular member.

4. The fishing lure of claim 3 further comprising a decoy body attached to said base member, said decoy body having a flat bottom to which said base member is attached and a central recess located in a region of said flat bottom associated with said associated aperture located in said contoured head section.

5. The fishing lure of claim 4 wherein said flanges of said hook contacting member have a height equal to the height of said opposed hook retaining flanges when said depressible trip lever is fully depressed.

6. A fishing lure, comprising:
   - a decoy body having a contoured upper surface and a flat bottom surface, said flat bottom surface having a central recess defined therein;
   - a base member attached to said decoy body having a flat midsection, a contoured head section contiguous thereto and a flat tail section contiguous to said midsection and opposed to said tail section, said flat tail section having outwardly flared opposed hook retaining flanges said contoured head section overlying said central recess;
   - a fish hook attached to said base member, said fish hook having a first hook member, a second hook member, and means for biasingly extending said first and second hook members away from one another, said first and second hook members compressibly movable between a first extended position and a second retracted position, wherein said biasing means of said fish hook comprises a compressible semi-circular central planar member having two spaced-apart ends, and said first and second hook members each comprising a point, a bend contiguous to said point, a shank contiguous with said bend having a second end opposed to said bend, said second ends attached respectively to said spaced apart ends of said compressible semi-circular central planar member;

a depressible trip lever pivotally connected to said base member and positioned between said base member and said first and second hook members to disengage said hook members from retention behind said hook retaining flanges, said trip lever comprising an elongated lever arm having a first end projecting into an aperture located in said contoured head section of said base member and inwardly and outwardly movable relative thereto, a second end opposed to said first end, an essentially flat section of uniform width extending between said first end and said second end, pivotal attachment means located between said first end and said second end, said second end terminating in a base contacting member adapted to releasably contact a point located in said flat tail section and a hook contacting member contiguously connected to said second end of said lever arm extending angularly outward therefrom, said hook contacting member having a central longitudinal junction and a pair of flanges depending therefrom; and means for pivotally connecting said depressible trip lever to said base member, said pivotal connecting means comprising:
  a curved tabular member having first and second ends integrally attached to said base member and a central portion extending outwardly therefrom, said central portion defining a throughbore;
  a pair of parallel tabs extending perpendicularly outward from said elongated lever arm of said depressible trip lever, said tabs each having a central aperture defined therein; and
  a rod member extending through said apertures and said curved tabular member.

7. In a fishing lure having:
a decoy body;
a base member attached to said decoy body having a flat midsection, a contoured head section contiguous thereto and a flat tail section contiguous to said midsection and opposed to said tail section, said flat tail section having outwardly flared opposed hook retaining flanges;
a fish hook attached to said base member, said fish hook having a first hook member, a second hook member, and means for biasingly extending said first and second hook members away from one another, said first and second hook members compressibly movable between a first extended position and a second retracted position;
a depressible trip lever pivotally connected to said base member and positioned to contact said first and second hook members disengaging said hook members from retention behind said hook retaining flanges; and
means for pivotally connecting said depressible trip lever to said base member;
wherein said improvement comprises said trip lever having an elongated lever arm with a first end movable inwardly and outwardly relative to an aperture located in said contoured head section of said base member, a second end opposed to said first end, an elongated flat region having an essentially uniform width extending from said first end to said second end, said second end terminating in a region moveable between a lower base-contacting position and an elevated position, and a hook contacting member contiguously connected to said second end of said lever arm, said hook contacting member having a central longitudinal junction and a pair of flanges depending therefrom, said flanges adapted to be positioned in a first lowered position between said base member and said first and second hook members when said members are in said retracted position behind said hook retaining flanges and moveable to a second elevated position wherein at least a portion of said flanges extends above said hook retaining flanges when said first end of said lever arm is depressed; and
wherein said improvement further comprises said pivotal connecting means comprising:
  a curved tabular member having first and second ends integrally attached to said base member and a central portion extending outwardly therefrom, said central portion defining a throughbore;
  a pair of parallel tabs extending perpendicularly outward from said elongated lever arm of said depressible trip lever, said tabs each having a central aperture defined therein; and
  a rod member extending through said apertures and said curved tabular member.

8. The fishing lure of claim 7 wherein said biasing means of said fish hook comprises a compressible semi-circular central planar member having two spaced-apart ends, and said first and second hook members each comprising a point, a bend contiguous to said point, a shank contiguous with said bend having a second end opposed to said bend, said second ends attached respectively to said spaced apart ends of said compressible semi-circular central planar member.

* * * * *